US012300395B2

(12) United States Patent
Snuggerud

(10) Patent No.: US 12,300,395 B2
(45) Date of Patent: May 13, 2025

(54) SERVICING A NUCLEAR REACTOR MODULE

(71) Applicant: NuScale Power, LLC, Portland, OR (US)

(72) Inventor: Ross Snuggerud, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 0 days.

(21) Appl. No.: 18/305,036

(22) Filed: Apr. 21, 2023

(65) Prior Publication Data

US 2023/0253127 A1    Aug. 10, 2023

Related U.S. Application Data

(60) Division of application No. 17/090,744, filed on Nov. 5, 2020, now Pat. No. 11,670,428, which is a
(Continued)

(51) Int. Cl.
*G21C 19/32* (2006.01)
*B66C 13/44* (2006.01)
(Continued)

(52) U.S. Cl.
CPC ............ *G21C 19/207* (2013.01); *B66C 13/44* (2013.01); *B66C 13/46* (2013.01); *G21C 17/10* (2013.01); *G21D 1/00* (2013.01); *G21D 1/003* (2013.01); *B66C 13/00* (2013.01); *B66C 13/063* (2013.01); *B66C 13/085* (2013.01); *B66C 13/14* (2013.01); *B66C 17/00* (2013.01); *B66C 17/06* (2013.01); *B66C 17/26* (2013.01); *B66C 19/00* (2013.01); *B66C 25/00* (2013.01); *G21C 1/322* (2013.01); *G21C 17/06* (2013.01); *G21C 19/32* (2013.01); *Y02E 30/30* (2013.01); *Y10T 29/49721* (2015.01); *Y10T 29/53539* (2015.01)

(58) Field of Classification Search
None
See application file for complete search history.

(56) References Cited

U.S. PATENT DOCUMENTS 2,942,736 A     6/1960   William
3,419,467 A    12/1968   Rolf
(Continued)

FOREIGN PATENT DOCUMENTS

CN      106098125 A  *  11/2016
DE        1531183 A1 *   1/1970
(Continued)

OTHER PUBLICATIONS

Reyes, Jose. Introduction to NuScale Design PPT. 26 pages. available at <https://nuclearstreet.com/cfs-file/_key/telligent-evolution-components-attachments/13-97-00-00-00-01-58-68/Introduction-to-NuScale-Design.pdf>. (Year:2008) (Year: 2008).*
(Continued)

*Primary Examiner* — Lily C Garner
(74) *Attorney, Agent, or Firm* — Lee & Hayes, P.C.

(57) ABSTRACT

A system for servicing a nuclear reactor module comprises a crane operable to attach to the nuclear reactor module, wherein the crane includes provisions for routing signals from one or more sensors of the nuclear reactor module to one or more sensor receivers.

21 Claims, 3 Drawing Sheets

Related U.S. Application Data continuation of application No. 15/609,997, filed on May 31, 2017, now Pat. No. 10,854,345, which is a division of application No. 14/350,689, filed as application No. PCT/US2012/027525 on Mar. 2, 2012, now Pat. No. 9,697,917.

(51) Int. Cl.

| | | |
|---|---|---|
| *B66C 13/46* | (2006.01) | |
| *G21C 17/10* | (2006.01) | |
| *G21C 19/20* | (2006.01) | |
| *G21D 1/00* | (2006.01) | |
| B66C 13/00 | (2006.01) | |
| B66C 13/06 | (2006.01) | |
| B66C 13/08 | (2006.01) | |
| B66C 13/14 | (2006.01) | |
| B66C 17/00 | (2006.01) | |
| B66C 17/06 | (2006.01) | |
| B66C 17/26 | (2006.01) | |
| B66C 19/00 | (2006.01) | |
| B66C 25/00 | (2006.01) | |
| G21C 1/32 | (2006.01) | |
| G21C 17/06 | (2006.01) | |

(56) References Cited

U.S. PATENT DOCUMENTS

| | | | |
|---|---|---|---|
| 3,612,860 A | 10/1971 | Hackney | |
| 3,936,348 A | 2/1976 | Wachter | |
| 3,986,367 A | 10/1976 | Kalpins | |
| 4,039,376 A | 8/1977 | Wachter | |
| 4,081,086 A | 3/1978 | Shallenberger | |
| 4,155,808 A | 5/1979 | Jabsen | |
| 4,313,793 A * | 2/1982 | Klumb | G21C 17/10 |
| | | | 376/245 |
| 4,427,623 A | 1/1984 | Howard | |
| 4,482,520 A | 11/1984 | Randazza | |
| 4,487,741 A | 12/1984 | Vuckovich | |
| 4,539,174 A | 9/1985 | Patenaude | |
| 4,577,487 A | 3/1986 | Dooley | |
| 4,650,637 A | 3/1987 | Chubb | |
| 4,697,322 A | 10/1987 | Knecht | |
| 4,713,212 A | 12/1987 | Plumier | |
| 4,715,111 A | 12/1987 | Kapoor | |
| 5,078,957 A * | 1/1992 | Tower | G21C 17/10 |
| | | | 376/245 |
| 5,089,213 A | 2/1992 | Omote | |
| 5,104,612 A * | 4/1992 | Rousar | G21C 17/08 |
| | | | 376/288 |
| 5,241,572 A * | 8/1993 | Matthews | B66C 11/12 |
| | | | 405/196 |
| 5,490,185 A | 2/1996 | Dent | |
| 5,539,789 A * | 7/1996 | Wachter | G21C 17/07 |
| | | | 376/271 |
| 5,544,208 A | 8/1996 | Pao | |
| 5,661,768 A | 8/1997 | Gilligan, III | |
| 5,687,207 A | 11/1997 | Meuschke | |
| 6,404,836 B1 | 6/2002 | Matteson | |
| 6,493,413 B1 | 12/2002 | Galioto | |
| 6,788,755 B2 | 9/2004 | Weber | |
| 8,599,988 B2 | 12/2013 | Stefko | |
| 9,318,227 B2 | 4/2016 | Harkness | |
| 9,697,917 B2 | 7/2017 | Snuggerud | |
| 10,497,482 B2 | 12/2019 | Keller | |
| 2004/0095154 A1 | 5/2004 | Lundstrom | |
| 2010/0150693 A1 | 6/2010 | Frassinelli | |
| 2011/0087115 A1 | 4/2011 | Sackner | |
| 2011/0235769 A1 | 9/2011 | Stefko | |
| 2012/0132605 A1 | 5/2012 | Ogawa | |
| 2014/0366354 A1 | 12/2014 | Snuggerud | |
| 2015/0364224 A1 | 12/2015 | Minamiyama | |
| 2020/0051704 A1 | 2/2020 | Keller | |

FOREIGN PATENT DOCUMENTS

| | | | | |
|---|---|---|---|---|
| EP | 2123591 A1 * | 11/2009 | | B66C 15/065 |
| FR | 1544265 A * | 10/1968 | | |
| FR | 2591210 A1 | 6/1987 | | |
| GB | 2099255 A | 9/1985 | | |
| JP | 60171491 A * | 9/1985 | | |
| JP | S63225192 A | 9/1988 | | |
| JP | 04353799 A * | 12/1992 | | |
| JP | 9026496 A | 1/1997 | | |
| JP | H0926496 A | 1/1997 | | |
| KR | 20100047537 A * | 5/2010 | | |
| WO | WO2001069608 A1 | 9/2001 | | |

OTHER PUBLICATIONS

International Preliminary Report on Patentability for International Application No. PCT/US2012/027525, mailed Sep. 2, 2014, 7 pages.

International Search Report and Written Opinion for International Application No. PCT/US2012/027525, dated Nov. 9, 2012, 9 pages.

Modro, et al., "Multi-Application Small Light Water Reactor Final Report," Idaho National Engineering and Environmental Laboratory, 2003.

Power, NuScale. "Refueling Operations Report for the NuScale Power Module," Rev. 0, 2009.

* cited by examiner

SERVICING A NUCLEAR REACTOR MODULE

CROSS-REFERENCE TO RELATED APPLICATIONS

This application is a divisional of U.S. patent application Ser. No. 17/090,744 filed on Nov. 5, 2020, which is a continuation of U.S. patent application Ser. No. 15/609,997 filed on May 31, 2017, and issued as U.S. Pat. No. 10,854,345 on Dec. 1, 2020, which is a divisional of U.S. patent application Ser. No. 14/350,689 filed on Apr. 9, 2014, and issued as U.S. Pat. No. 9,697,917 on Jul. 4, 2017, which is a national stage application of International Application No. PCT/US2012/027525 filed on Mar. 2, 2012, each of which is incorporated herein by reference in its entirety.

BACKGROUND

In a nuclear reactor, a core of nuclear material is confined to a small volume internal to the reactor so that a reaction may occur. In many instances, a controlled nuclear reaction may persist for an extended period of time, such as several years or even longer, before refueling of the nuclear core is required. Accordingly, when used as a source of heat for converting quantities of water into steam, a properly designed nuclear reactor may provide a long-lasting, carbon-free, and highly reliable source of energy.

Relatively small, modular or standalone nuclear reactors may be built in a manufacturing environment and transported to a reactor bay at a power generating facility that is far removed from the manufacturing location. A group of modular nuclear reactors of the same design may be aggregated at the power generating facility to provide a multiple of the power output of a single, standalone reactor module. This allows additional modules to be placed into service over time so that the output of a power generating station may be incrementally increased to keep pace with a growing demand for electrical power. For example, a power generating station that initially employs two nuclear reactor modules servicing a small town may incorporate additional modules in several increments as the town increases in size and the demand for electrical power increases correspondingly.

When refueling a nuclear reactor module, a servicing crew may disassemble various reactor components so that spent fuel can be removed and stored in a spent fuel pool. In addition to loading fresh fuel into the reactor, the servicing crew may be required to perform additional maintenance operations. These operations may include inspecting the reactor module components for excessive wear, leak testing of components that operate under pressure, and inspecting structural and load-bearing components for stress cracks. In some instances, it may be useful to perform such servicing at a location separate from the reactor's normal operating bay.

SUMMARY

In a general embodiment, a method of servicing a nuclear reactor module includes decoupling one or more sensors of the nuclear reactor module from a first sensor receiver, followed by coupling the one or more sensors of the nuclear reactor module to a second sensor receiver, and moving the nuclear reactor module from a first location, such as a reactor bay, to a second location, such as a servicing area.

A first aspect combinable with the general embodiment includes displaying a representation of at least one signal from the one or more sensors of the nuclear reactor module on a display located within a servicing area.

In a second aspect combinable with any of the previous aspects, the representation of the at least one signal from the one or more sensors of the nuclear reactor module may be displayed on a display located in a reactor operator area.

Include transmitting signals from the one or more sensors of the nuclear reactor module through a conduit located on a crane coupled to the nuclear reactor module to the second receiver.

In an aspect, which may be combinable with any previous aspect, the decoupling and coupling occur in a sensor-by-sensor manner wherein a first sensor of two or more sensors of the nuclear reactor module is decoupled from the first sensor receiver and coupled to the second sensor receiver prior to a second sensor of the two or more sensors of the nuclear reactor module being decoupled from the first sensor receiver.

In an aspect of an embodiment, the method may further include comparing a signal level from the first sensor received by the first sensor receiver with a signal level from the first sensor received by the second sensor receiver. Wherein, in an aspect that may be combinable with any previous aspect, if the signal level from the first sensor received by the first sensor receiver approximates the signal level from the first sensor received by the second sensor receiver, the method may include decoupling a second sensor from the first sensor receiver. In an aspect, which may be combinable with any previous aspect, the method may further include approximately continuously monitoring the nuclear reactor module during the moving using the second sensor receiver.

In another embodiment, a system for servicing a nuclear reactor module includes a crane operable to couple to the nuclear reactor module, wherein the crane includes a conduit for routing signals from one or more sensors of the nuclear reactor module to one or more sensor receivers. In an aspect, which may be combinable with any previous aspect, the crane may include a drive mechanism operable to move the nuclear reactor module from a reactor bay to a servicing area. In an aspect, which may be combinable with any previous aspect, the drive mechanism may move the nuclear reactor module in a first direction and a second direction approximately orthogonal to the first direction. In an aspect, which may be combinable with any previous aspect, the crane may further include at least one support bracket for mounting one or more sensor signal receivers operable to receive signals from one or more sensors within the nuclear reactor module. In an aspect, which may be combinable with any previous aspect, the system may further include a display operable to display representations of signals from the one or more sensors of the nuclear reactor module in a servicing area and may further include a display operable to display representations of signals from the one or more sensors of the nuclear reactor module in an operator area.

In another general embodiment, an apparatus includes a fastener operable to couple to a nuclear reactor module, an interface panel for accepting one or more signals from the nuclear reactor module, and a device operable to move the nuclear reactor module in a lateral direction.

In a first aspect combinable with the general embodiment, the device is operable to move the nuclear reactor module in the lateral direction operates to move the nuclear reactor module in a first direction and a second direction approximately orthogonal to the first direction.

A second aspect combinable with any of the previous aspects includes a track for maintaining a minimum bend radius of at least one conductor conveying the one or more signal.

A third aspect, which may be combinable with any of the previous aspects, includes a controller for assisting and relocating a nuclear reactor module to a lower containment vessel removal fixture located in a servicing area. A fourth aspect, which may be combinable with any of the previous aspects, includes a conduit operable to hold a receiver that receives signals from one or more sensors located within the nuclear reactor module.

BRIEF DESCRIPTION OF THE DRAWINGS

Preferred and alternative examples of the present invention are described in detail below with reference to the following drawings.

DETAILED DESCRIPTION

Figure 1:
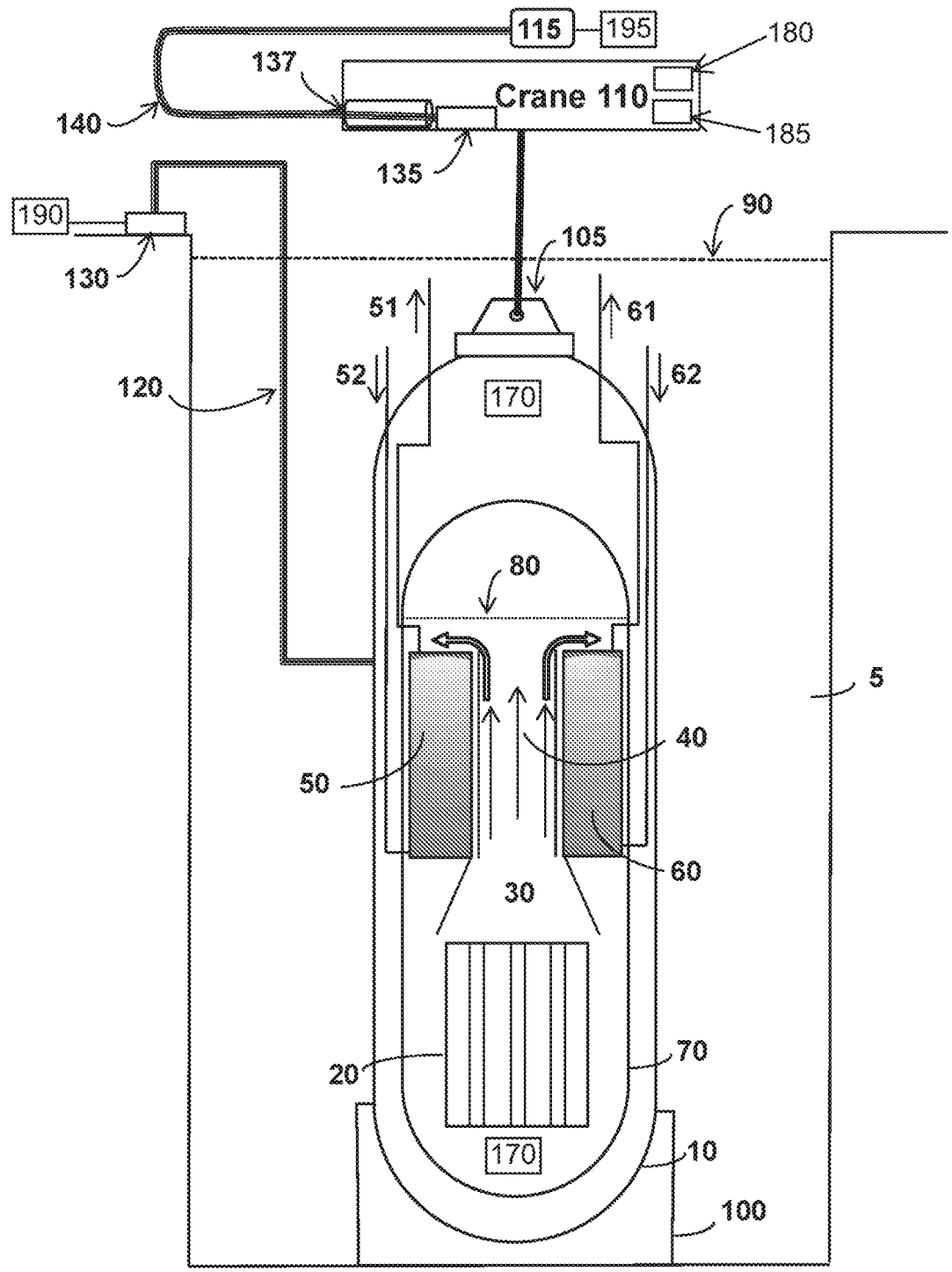
FIG. 1 shows a crane fastened to a nuclear reactor module according to an example implementation.

Methods, apparatuses, and systems for servicing a nuclear reactor module are described. In one implementation, pressure, temperature, source range neutron count, and other operating parameters of the nuclear reactor module may be monitored while the module is in operation. In preparation for a refueling or other servicing operation, a first sensor receiver located outside of the nuclear reactor module may be decoupled from sensors located within the reactor module. The sensors within the nuclear reactor module may then be coupled to a second sensor receiver by way of an electrical, fiber-optic, or other type of bundle routed along a routing path that is attached to, or included within, an overhead crane. Upon coupling of the sensors within the nuclear reactor module to the second sensor receiver, the overhead crane may be activated to move the module from an operating bay to a servicing area.

In another implementation, decoupling and coupling of sensors within the nuclear reactor module may occur in a sensor-by-sensor manner in which an output signal level from a first sensor located within a nuclear reactor module may be recorded prior to decoupling the first sensor from a first sensor receiver. The first sensor may then be coupled to a second sensor receiver. The output signal level recorded by the first sensor receiver may then be compared with the output signal level recorded by the second sensor receiver to determine if an error condition in the first or the second sensor receiver is present. An error condition may also result from a defect in wire or fiber optic cable bundle used to couple a sensor to a sensor receiver. In the event that an error condition is not present, the comparison process may be repeated for a second sensor located within a reactor module beginning with recording an output signal level from the second sensor, decoupling the second sensor from a first sensor receiver, and comparing the output signal level received by the first sensor receiver with the output signal level received by the second sensor receiver to determine if an error condition is present.

In an implementation, an overhead crane may include an interface panel that receives output signals from two or more sensors within the nuclear reactor module prior to movement of the module. In this implementation, an operator may decouple the two or more sensors, as a group, from a first sensor receiver and couple the group of one or more sensors to a second sensor receiver by way of the interface panel. This allows the group of two or more sensors to be decoupled nearly simultaneously from a first sensor receiver and quickly coupled to a second sensor receiver.

As used herein and as described in greater detail in subsequent sections, embodiments of the invention may include various nuclear reactor technologies. Thus, some implementations may include reactor technologies that employ pressurized water, which may include boron and/or other chemicals or compounds in addition to water, liquid metal cooling, gas cooling, molten salt cooling, and/or other cooling methods. Implementations may also include nuclear reactors that employ uranium oxides, uranium hydrides, uranium nitrides, uranium carbides, mixed oxides, and/or other types of radioactive fuel. It should be noted that embodiments are not limited to any particular type of reactor cooling mechanism, nor to any particular type of fuel employed to produce heat within or associated with a nuclear reaction.

FIG. 1 shows a crane (110) fastened to a nuclear reactor module according to an implementation. In FIG. 1, reactor core 20 is positioned at a bottom portion of a cylinder-shaped or capsule-shaped reactor vessel 70. Reactor core 20 comprises a quantity of fissile material that produces a controlled reaction that may occur over a period of perhaps several years or longer. Although not shown explicitly in FIG. 1, control rods may be employed to control the rate of fission within reactor core 20. Control rods may comprise silver, indium, cadmium, boron, cobalt, hafnium, dysprosium, gadolinium, samarium, erbium, and europium, or their alloys and compounds. However, these are merely a few of many possible control rod materials.

In implementations, a cylinder-shaped or capsule-shaped containment vessel 10 surrounds reactor vessel 70 and is partially or completely submerged in a reactor pool, such as below waterline 90, within reactor bay 5. The volume between reactor vessel 70 and containment vessel 10 may be partially or completely evacuated to reduce heat transfer from reactor vessel 70 to the reactor pool. However, in other embodiments, the volume between reactor vessel 70 and containment vessel 10 may be at least partially filled with a gas and/or a liquid that increases heat transfer between the reactor and containment vessels. Containment vessel 10 rests on skirt 100 at the base of reactor bay 5.

In a particular implementation, reactor core 20 is submerged within a liquid, such as water, which may include boron or other additive, which rises into channel 30 after making contact with a surface of the reactor core. In FIG. 1, the upward motion of heated coolant is represented by arrows 40 within channel 30. The coolant travels over the top of heat exchangers 50 and 60 and is drawn downward by way of convection along the inner walls of reactor vessel 70 thus allowing the coolant to impart heat to heat exchangers 50 and 60. After reaching a bottom portion of the reactor vessel, contact with reactor core 20 results in heating the coolant, which again rises through channel 30.

Although heat exchangers 50 and 60 are shown as two distinct elements in FIG. 1, heat exchangers 50 and 60 may represent any number of helical coils that wrap around at least a portion of channel 30. In another implementation, a different number of helical coils may wrap around channel 30 in an opposite direction, in which, for example, a first helical coil wraps helically in a counterclockwise direction, while a second helical coil wraps helically in a clockwise direction. However, nothing prevents the use of differently-configured and/or differently-oriented heat exchangers and embodiments are not limited in this regard. Further, although water line 80 is shown as being positioned just above upper portions of heat exchangers 50 and 60, in other implementations, reactor vessel 70 may include lesser or greater amounts of water.

In FIG. 1, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 70 in a manner that induces a thermal siphoning process. In the example of FIG. 1, coolant within reactor vessel 70 remains at a pressure above atmospheric pressure, thus allowing the coolant to maintain a high temperature without vaporizing (i.e. boiling).

As coolant within heat exchangers 50 and 60 increases in temperature, the coolant may begin to boil. As the coolant within heat exchangers 50 and 60 boils, vaporized coolant, such as steam moving upward as indicated by arrows 51 and 61, may be used to drive one or more turbines that convert the thermal potential energy of steam into electrical energy. After condensing, coolant is returned to locations near the base of heat exchangers 50 and 60 as shown by arrows 52 and 62.

During normal operation of the reactor module of FIG. 1, various performance parameters of the reactor may be monitored by way of sensors 170 positioned at various locations within the module. In the example of FIG. 1, sensors 170 within the reactor module may measure reactor system temperatures, reactor system pressures, containment vessel pressure, reactor primary and/or secondary coolant levels, reactor core neutron flux, and/or reactor core neutron fluence. Signals that represent these measurements may be reported external to the reactor module by way of bundle 120 to reactor bay interface panel 130. In one implementation, bundle 120 represents a multi-conductor cable. In another implementation, bundle 120 may represent a single- or multi-fiber optical transmission medium.

In the implementation of FIG. 1, crane 110 is shown as being positioned above reactor bay 5. Crane 110 includes a cable or other device that fastens to attachment 105, which may include a lifting lug, eyelet, or other device that couples an upper portion of containment vessel 10 to crane 110. Thus, crane 110, using crane lifting mechanism 180, operates to lift and suspend the nuclear reactor module of FIG. 1 in reactor bay 5. In implementations, crane 110 includes a motor or other drive mechanism 185 that enables the crane to move laterally so as to allow the nuclear reactor module to be repositioned.

Prior to the upward or lateral movement of the nuclear reactor module of FIG. 1, a connector at an end of bundle 120 may be detached from reactor bay interface panel 130, thereby decoupling one or more sensors 170 operating within the reactor module from a first sensor receiver 190 (e.g., a sensor signal receiver or signal receiver). In an implementation, bundle 120 may be attached to crane interface panel 135, thereby coupling the one or more sensors 170 operating within the reactor module to a second sensor receiver 195 (e.g., a sensor signal receiver or signal receiver) by way of crane interface panel 135. In FIG. 1, crane 110 includes provisions for routing bundle 140 through, for example, conduit 137, along an outside surface of at least a portion of the crane, or within the structure of crane 110 for connection to receptacle 115. In an implementation, crane 110 includes a track for maintaining a minimum bend radius of bundle 140 while crane 110 moves from side to side. However, in other implementations, crane 110 may include a rack for festooning or hanging portions of bundle 140 from a surface.

In an implementation, crane interface panel 135 may include, for example, at least one set of brackets or a conduit that holds one or more signal conditioning units or other sensor receivers that function to convert electrical and/or optical signals from sensors 170 located within the reactor module of FIG. 1. In one possible example, bundle 120 may carry low-voltage signals from a thermocouple located within reactor vessel 70. Accordingly, crane interface panel 135 may include one or more of an amplifier, an analog to digital converter, and a multiplexer that converts and electrical signal conveyed on a conductor to an optical signal transmitted along a single-fiber or multi-fiber optical transmission medium represented by bundle 140.

Figure 2:
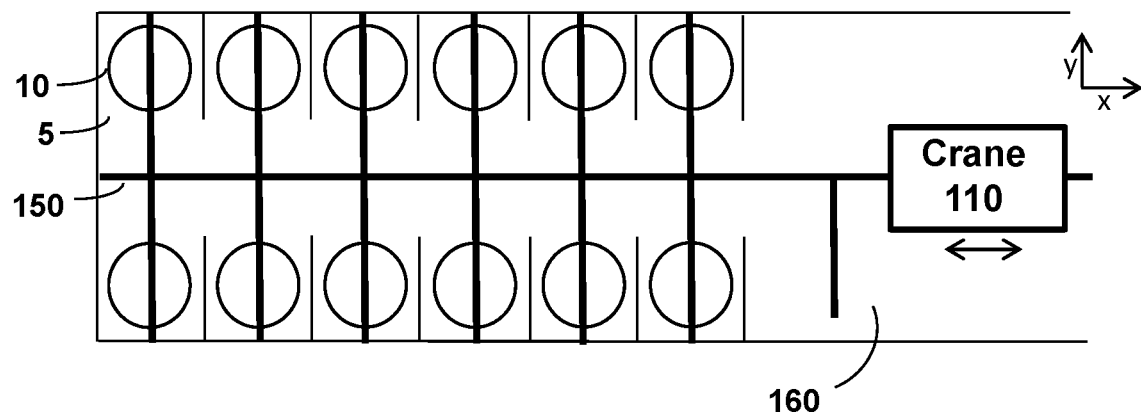
FIG. 2 is a top view showing 12 nuclear reactor modules that may be moved within a power generating station using an overhead crane according to an example implementation.

FIG. 2 is a top view showing 12 nuclear reactor modules that may be moved within a power generating station using an overhead crane according to an implementation. In FIG. 2, containment vessel 10 of a nuclear reactor module is shown within reactor bay 5. Crane 110 moves in both an X and Y direction along track 150, wherein X and Y represent orthogonal directions in a Cartesian coordinate system. In this manner, crane 110 may include a control capable of relocating or assisting in relocating a nuclear reactor module from reactor bay 5, along track 150, to servicing area 160 where the nuclear reactor module may be placed on or proximate with a lower containment vessel removal fixture. Prior to movement of a nuclear reactor module, sensors located within a reactor module may be decoupled from a first sensor receiver to a second sensor receiver by way of detaching a connector from a reactor bay interface panel to a crane interface panel, such as crane interface panel 135 of FIG. 1.

Figure 3:
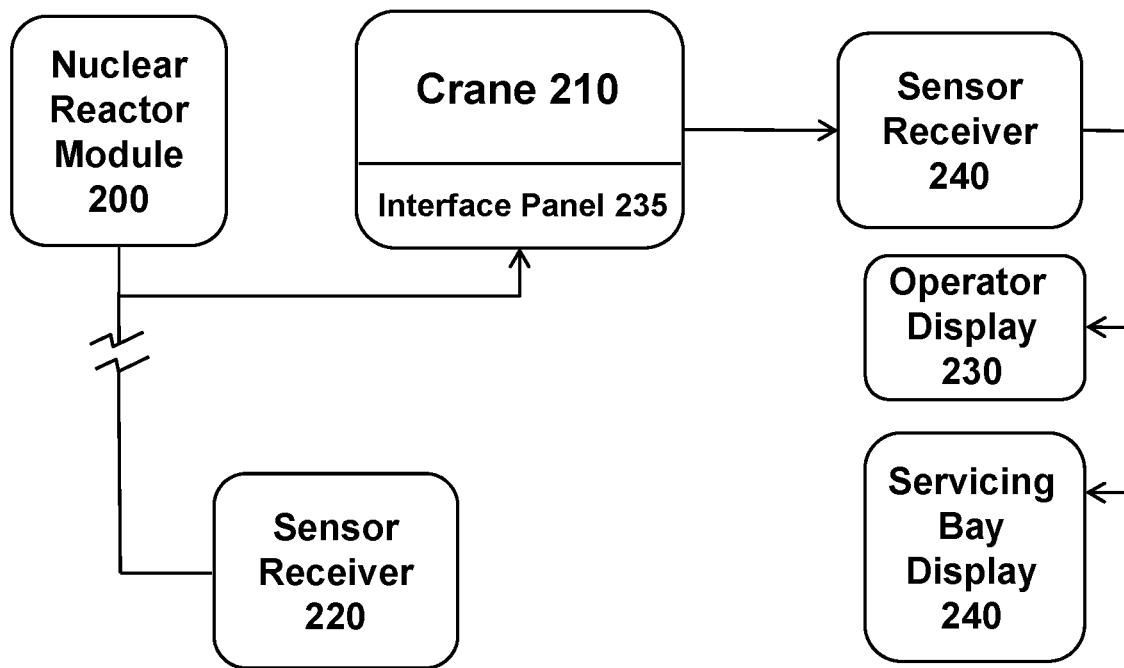
FIG. 3 is a diagram of a nuclear reactor module coupled to sensor receivers and displays according to an example implementation.

FIG. 3 is a diagram of a nuclear reactor module coupled to sensor receivers and displays according to an implementation. In FIG. 3, sensors from nuclear reactor module 200 have been decoupled from sensor receiver 220 and operator display 230. In an implementation, operator display 230 represents one or more displays located in a reactor operator area. After such decoupling, sensors located within nuclear reactor module 200 are coupled to a second sensor receiver (240) by way of interface panel 235 of crane 210.

After nuclear reactor module 200 has been coupled to sensor receiver 240, module 200 may then be relocated from, for example, a reactor operating bay to a servicing area. While module 200 is in transit from the reactor bay to the servicing area, sensors monitoring various parameters may continue to provide output signals representing the conditions within the module. Representations of these parameters may be displayed on servicing area display 240, thus providing real-time monitoring of conditions within reactor module 200 to a servicing crew. Additionally, representations of output signals reflecting the conditions within reactor module 200 may be displayed on operator display 230. These representations on operator display 230 may be accompanied by an identifier indicating that the module is "in transit" between and operating bay to a servicing area.

Figure 4:
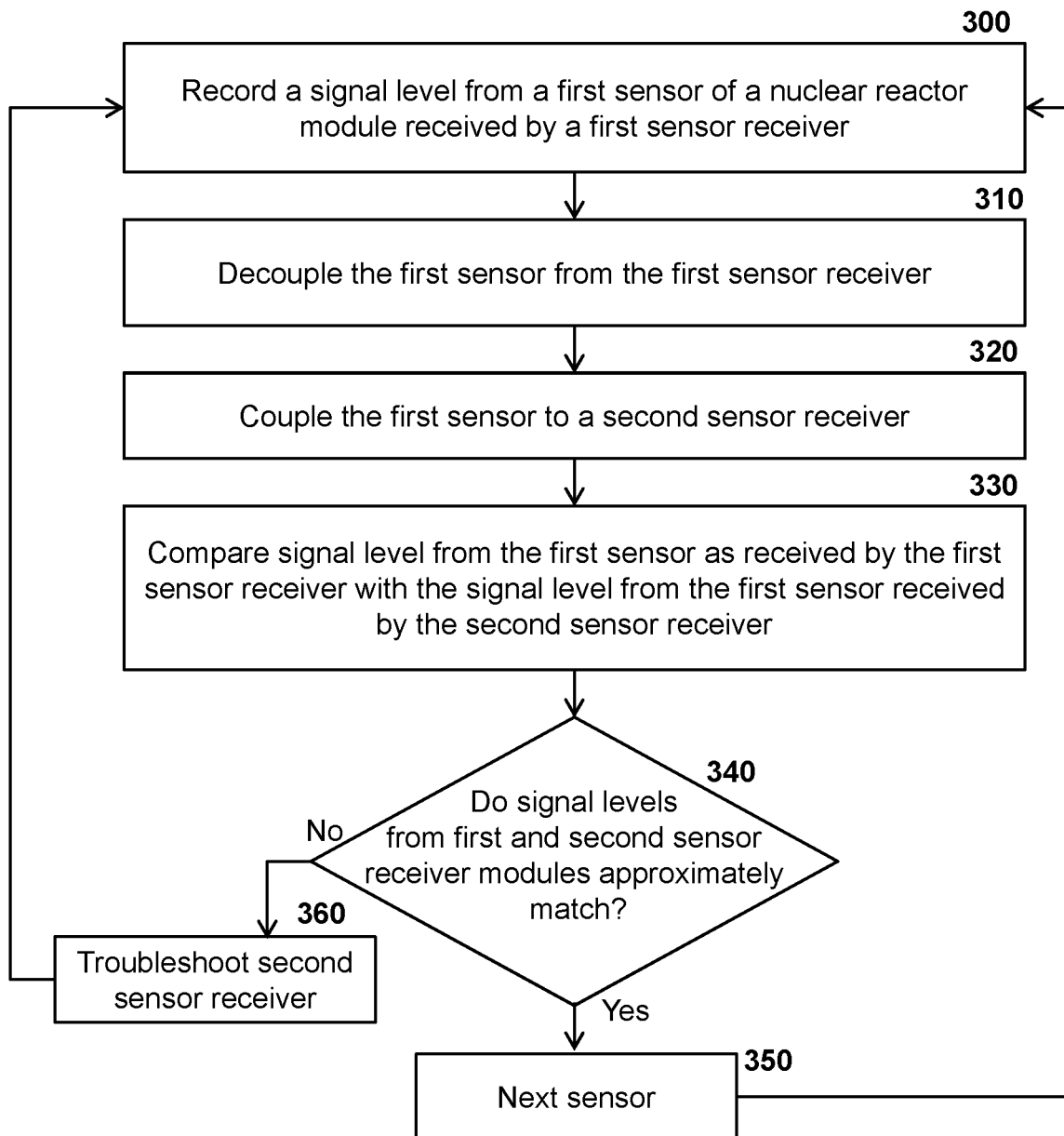
FIG. 4 is a flowchart for a method for servicing a nuclear reactor module according to an example implementation.

FIG. 4 is a flowchart for a method for servicing a nuclear reactor module according to an implementation. The device of FIG. 3 may be suitable for performing the method of FIG. 4, although nothing prevents performing the method of FIG. 4 using alternate arrangements of components in other embodiments. Implementations may include blocks in addition to those shown and/or described in FIG. 4, fewer blocks, blocks occurring in an order different from FIG. 4, or any combination thereof. In the method described in FIG. 4, sensors are coupled from a first receiver to a second receiver in a sensor-by-sensor manner as described below. In an implementation, at least a portion of the method of FIG. 4 may be performed by a controller or other hardware or software based processing resource.

FIG. 4 begins at block 300, which includes recording a signal level from a first sensor of a nuclear reactor module received by a first sensor receiver. At 310, the first sensor may be decoupled from the first sensor receiver. At 320, the first sensor may be coupled to a second sensor receiver. At 330, a signal level from the first sensor as received by the first sensor receiver is compared with the signal level from the first sensor has received by the second sensor.

At 340, signal levels as received by first and second sensor receiver modules are compared. In the event that the comparison of block 340 indicates that the signal levels are within a limit, block 350 is performed in which a signal output from the next sensor received by a first sensor receiver module may be recorded. In the event that the comparison of block 340 indicates that the signal levels are outside of a limit, block 360 may be performed in which a troubleshooting routine may be performed.

While several examples have been illustrated and described, it will be understood by those skilled in the art that various other modifications may be made, and equivalents may be substituted, without departing from the scope of the following claims.

I claim:

1. A device for moving a nuclear reactor, comprising:
an attachment shaped to releasably engage the nuclear reactor;
a crane connected to the attachment and positioned to move the nuclear reactor when the attachment is engaged with the nuclear reactor;
a first interface panel disposed within the crane couplable to a sensor, the sensor being disposed within a reactor vessel of the nuclear reactor, wherein the first interface panel is configured to receive at least one or more signals from the sensor associated with at least one or more parameters of the nuclear reactor when the attachment is engaged with the nuclear reactor; and
a second interface panel disposed within a reactor bay, wherein the second interface panel is releasably couplable to a bundle of the nuclear reactor for receiving the signals from the sensor associated with at least one or more parameters of the nuclear reactor when the attachment is not engaged with the nuclear reactor.

2. The device of claim 1, wherein:
the crane is positioned to move the nuclear reactor when the attachment is engaged with the nuclear reactor; and
the first interface panel being coupled to the crane, wherein the first interface panel is releasably couplable to the bundle of the nuclear reactor for receiving the signals from the sensor disposed within the reactor vessel of the nuclear reactor; and further comprising:
a second bundle coupled between the first interface panel and a signal receiver for routing the signals from the first interface panel to the signal receiver.

3. The device of claim 2 wherein the signal receiver is coupled to the crane such that the signal receiver moves with the nuclear reactor when the crane moves the nuclear reactor.

4. The device of claim 2 wherein the signal receiver is spaced apart from the crane such that the signal receiver does not move with the nuclear reactor when the crane moves the nuclear reactor.

5. The device of claim 2, further comprising a track positioned to receive the second bundle, wherein the track is shaped to maintain a minimum bend radius of the second bundle when the crane moves the nuclear reactor.

6. The device of claim 1 wherein the crane is positioned to move the nuclear reactor both vertically and laterally.

7. The device of claim 1 wherein the signal receiver is coupled to the crane such that the signal receiver moves together with the crane when the crane moves the nuclear reactor.

8. The device of claim 1 wherein the signal receiver is spaced apart from the crane such that the signal receiver does not move with the crane when the crane moves the nuclear reactor.

9. The device of claim 1 wherein the crane is positioned to lift the nuclear reactor.

10. The device of claim 1, further comprising a track, wherein the crane is constrained to move along the track.

11. The device of claim 10 wherein the crane is constrained to move along the track in a first direction and a second direction orthogonal to the first direction.

12. The device of claim 1 wherein the crane is positioned to move the nuclear reactor from the reactor bay to a servicing area, wherein the reactor bay is positioned to receive the nuclear reactor in a normal operating state, and wherein the servicing area is positioned to receive the nuclear reactor in a servicing state.

13. A method for moving a nuclear reactor, comprising:
releasably engaging the nuclear reactor via an attachment;
moving, via a crane, the nuclear reactor when the attachment is engaged with the nuclear reactor; and
coupling a first interface panel disposed within the crane to a sensor disposed within a reactor vessel of the nuclear reactor, wherein the first interface panel is configured to receive at least one or more signals from the sensor associated with at least one or more parameters of the nuclear reactor when the attachment is engaged with the nuclear reactor.

14. The method of claim 13, further comprising:
releasably coupling the first interface panel to a bundle of the nuclear reactor for receiving the signals from the sensor disposed within the reactor vessel of the nuclear reactor.

15. The method of claim 13, further comprising:
positioning the crane to move the nuclear reactor when the attachment is engaged with the nuclear reactor,
wherein a second interface panel is releasably couplable to a first bundle of the nuclear reactor for receiving the signals from the sensor disposed within the reactor vessel of the nuclear reactor when the attachment is not engaged with the nuclear reactor, and
wherein a second bundle is coupled between the first interface panel and a signal receiver for routing the signals from the first interface panel to the signal receiver.

16. The method of claim 15, further comprising:
coupling the signal receiver to the crane such that the signal receiver moves with the nuclear reactor when the crane moves the nuclear reactor.

17. The method of claim 15, further comprising:
positioning a track to receive the second bundle,
wherein the track is shaped to maintain a minimum bend radius of the second bundle when the crane moves the nuclear reactor.

18. The method of claim 13, further comprising:
positioning the crane to move the nuclear reactor both vertically and laterally.

19. The method of claim 13, further comprising:
coupling the signal receiver to the crane such that the signal receiver moves together with the crane when the crane moves the nuclear reactor.

20. The method of claim 13, positioning the crane to lift the nuclear reactor.

21. The method of claim 13, further comprising a track, constraining the crane to move along the track.

\* \* \* \* \*